United States Patent
Chou et al.

(10) Patent No.: US 12,531,347 B2
(45) Date of Patent: Jan. 20, 2026

(54) ANTENNA SYSTEM CAPABLE OF BEAM DIRECTION RECONFIGURATION AND ADJUSTMENT AND ALLOWING SHARED USE OF RADIO-FREQUENCY INTEGRATED CIRCUIT UNITS

(71) Applicant: Strong-Wave Radio Technology Inc., Taoyuan (TW)

(72) Inventors: Hsi Tseng Chou, Taoyuan (TW); Zhi Da Yan, Taoyuan (TW); Chien Hsin An, Taoyuan (TW); Siddhartha Panigrahi, Taoyuan (TW)

(73) Assignee: Strong-Wave Radio Technology Inc., Taoyuan (TW)

( * ) Notice: Subject to any disclaimer, the term of this patent is extended or adjusted under 35 U.S.C. 154(b) by 0 days.

(21) Appl. No.: 18/504,111

(22) Filed: Nov. 7, 2023

(65) Prior Publication Data

US 2025/0030170 A1    Jan. 23, 2025

(30) Foreign Application Priority Data

Jul. 18, 2023    (TW) .................. 112126790

(51) Int. Cl.
*H04B 7/0426* (2017.01)
*H01Q 1/22* (2006.01)
(Continued)

(52) U.S. Cl.
CPC ........... *H01Q 15/06* (2013.01); *H01Q 1/2208* (2013.01); *H01Q 3/245* (2013.01); *H01Q 15/02* (2013.01);
(Continued)

(58) Field of Classification Search
CPC ...... H01Q 15/06; H01Q 1/2208; H01Q 15/02; H01Q 15/04; H01Q 15/08; H01Q 15/10;
(Continued)

(56) References Cited

U.S. PATENT DOCUMENTS

2006/0293013 A1* 12/2006 Gazit .................... H01Q 1/007
                                                                          455/271
2012/0076498 A1*  3/2012 Sayeed ................. H01Q 19/06
                                                                          398/115
(Continued)

FOREIGN PATENT DOCUMENTS

| CN | 112103662 A | 12/2020 |
| CN | 114447597 A | 5/2022 |
| CN | 114498080 A | 5/2022 |

OTHER PUBLICATIONS

European Patent Office, "European Search Report and Search Opinion on European Patent Application No. EP23215441.9", Jun. 5, 2024, 11 pages, European Patent Office, Munich, Germany.

(Continued)

*Primary Examiner* — Dameon E Levi
*Assistant Examiner* — Yonchan J Kim
(74) *Attorney, Agent, or Firm* — CIPO IP Group (57) ABSTRACT

An antenna system for beam direction adjustment and shared use of radio-frequency integrated circuit (RFIC) units includes an array antenna module including feed antenna units for producing at least one input signal, RFIC units respectively electrically connected to the feed antenna units through switching units and less in number than the feed antenna units, a control module for controlling, based on at least one antenna configuration message, some of the switching units to be switched on and the rest thereof to be switched off, and a microwave lens module for forming at least one beam in a particular direction. A feed antenna unit electrically connected to the switched-on switching unit is in a working state, and can receive a signal from the RFIC units and radiate a corresponding input signal to the microwave lens module. The antenna system greatly reduces the number of RFIC units, thereby lowering the overall cost.

10 Claims, 9 Drawing Sheets

(51) Int. Cl.

| | | |
|---|---|---|
| *H01Q 3/24* | (2006.01) | |
| *H01Q 15/02* | (2006.01) | |
| *H01Q 15/06* | (2006.01) | |
| *H01Q 15/08* | (2006.01) | |
| *H01Q 19/06* | (2006.01) | |
| *H01Q 23/00* | (2006.01) | |
| *H01Q 25/00* | (2006.01) | |

(52) U.S. Cl.
CPC ............. *H01Q 15/08* (2013.01); *H01Q 19/06* (2013.01); *H01Q 19/062* (2013.01); *H01Q 23/00* (2013.01); *H01Q 25/00* (2013.01); *H04B 7/043* (2013.01)

(58) Field of Classification Search
CPC ........ H01Q 15/12; H01Q 3/245; H01Q 19/06; H01Q 19/062; H01Q 23/00; H01Q 25/00; H01Q 21/28; H01Q 1/50; H04B 7/043
See application file for complete search history.

(56) References Cited

U.S. PATENT DOCUMENTS

| | | | |
|---|---|---|---|
| 2016/0308277 A1* | 10/2016 | Leiba | ................. H01Q 3/24 |
| 2020/0212588 A1* | 7/2020 | Rofougaran | ............. H01Q 1/36 |
| 2021/0135355 A1* | 5/2021 | Diebold | .................. H01Q 3/36 |
| 2022/0109245 A1* | 4/2022 | Yang | ..................... H01Q 3/245 |

OTHER PUBLICATIONS

Cho et al, "RF Lens-Embedded Antenna Array for mmWave MIMO: Design and Performance", IEEE Communications Magazine, Jul. 25, 2018, pp. 42-48, vol. 56, No. 7, Institute of Electrical and Electronics Engineers, New York, NY, USA.

Qu et al, "Wide-Angle Scanning Lens Fed by Small-Scale Antenna Array for 5G in Millimeter-Wave Band", IEEE Transactions on Antennas and Propagation, Jan. 22, 2020, vol. 68, No. 5, pp. 3635-3643, Institute of Electrical and Electronics Engineers, New York, NY, USA.

* cited by examiner

ANTENNA SYSTEM CAPABLE OF BEAM DIRECTION RECONFIGURATION AND ADJUSTMENT AND ALLOWING SHARED USE OF RADIO-FREQUENCY INTEGRATED CIRCUIT UNITS

CROSS-REFERENCE TO RELATED PATENT APPLICATION

This non-provisional application claims priority to and the benefit of, under 35 U.S.C. § 119(a), Taiwan Patent Application No. 112126790, filed Jul. 18, 2023 in Taiwan. The entire content of the above identified application is incorporated herein by reference.

FIELD

The present disclosure relates to an antenna system, and more particularly to an active antenna system allowing shared use of radio-frequency integrated circuit (RFIC) units and adjusting the ON/OFF state of at least one switching unit to bring the corresponding feed antenna unit(s) into the working state.

BACKGROUND

In the field of communication technology, it is a common user requirement to direct a beam of radio waves precisely to a specific target (e.g., a satellite or vehicle) or to control or change the beam direction of an antenna in order to achieve higher signal quality. Generally, an active phased array antenna is used when it is necessary to change the transmission direction of a beam of radio waves, and the working principle of such an antenna is to increase or reduce the phase difference between a plurality of active antenna elements and thereby change the transmission direction of the resulting beam.

While an active phased array antenna driven by RFICs can change the transmission direction of a beam of radio waves, this beam steering technique still has a few inadequacies. First, when it is desired to change the beam direction, all the antenna elements must undergo a change in phase at the same time, which nevertheless increases the load of computation and control. Second, a large number of antenna elements are required for good directivity and a desirable beam shape, which adds to the complexity and cost of the equipment used by the antenna system. More specifically, each antenna element in the afore-referenced conventional antenna system design must be driven by an active RFIC to produce the reconfigurability, which is a relatively expensive device (in comparison with the other components); therefore, the cost of such an antenna system, especially where a huge number of antenna elements and RFICs need to be driven, will be prohibitively high. In addition, each RFIC requires a corresponding power and control signal, is subject to functional variation and possible failure during operation, and hence calls for a complex power distribution and control system and a complex monitoring and troubleshooting system. In other words, integrating a plethora of RFICs into an antenna system gives rise to high design complexity and makes it difficult to ensure the proper functioning of each RFIC among hundreds of RFICs. Some RFIC failures or malfunctions may degrade the antenna system performance.

In view of the above, one of the issues to be addressed in the present disclosure is to provide a novel antenna system that allows its beam shape and beam direction to be easily changed, helps reduce the design complexity and cost of the equipment used in the system, and effectively meets such requirements of dynamic transmission and reception of a modern communication network.

SUMMARY

Traditional active array antenna systems driven by active RFICs are associated with issues of high costs and high design complexity. Accordingly, in the present disclosure, based on years of extensive practical experience in professional antenna design and the research spirit for excellence, and as a result of longtime labored research and experiment, an antenna system capable of beam direction reconfiguration and adjustment and allowing shared use of RFIC units is provided, so as to provide better user experience and reduce system cost.

Certain aspects of the present disclosure are directed to an antenna system capable of beam direction reconfiguration and adjustment and allowing shared use of a common set of RFIC units. The antenna system includes an array antenna module, a plurality of RFIC units, a microwave lens module and a control module. The array antenna module includes a plurality of feed antenna units that can produce at least one input signal. The plurality of RFIC units are respectively electrically connected to the plurality of feed antenna units through a plurality of switching units. The number of the RFIC units is smaller than the number of the feed antenna units, and in certain embodiments, in several folds. The microwave lens module has a first side that can receive the at least one input signal. The microwave lens module can form at least one beam of electromagnetic waves corresponding to the at least input signal. The microwave lens module has a second side that can radiate the beam of electromagnetic waves in a particular direction. The control module is electrically connected to the plurality of switching units and RFICs' control ports, and can: control directly or indirectly each of the plurality of switching units to be switched on or off; receive at least one antenna configuration message; and control, based on the at least one antenna configuration message, at least one of the plurality of switching units to be switched on and the rest of the plurality of switching units to be switched off. At least one of the plurality of feed antenna units that is electrically connected to the switched-on at least one of the plurality of switching units is in a working state, and can receive at least one signal from the plurality of RFIC units, and radiate the at least one input signal corresponding to the at least one signal received from the plurality of RFIC units to the microwave lens module. After the switching units select a set of feed antenna units to radiate electromagnetic fields to illuminate the microwave lens module, the radiation pattern in amplitudes and phases from these feed antenna units is shaped by controlling the common set of RFICs. Accordingly, the antenna system greatly reduces the number of RFIC units through the shared use of the common set of RFIC units, thereby lowering the overall cost and design complexity. In addition, through the design of the microwave lens module, beam control that is more flexible and higher in efficacy can be realized.

In certain embodiments, the microwave lens module has a plurality of focal points on one side of the microwave lens module, and the array antenna module is located between the one side of the microwave lens module and the focal points. The radiation of the selected feed antenna units of the array antenna module is shaped by controlling the RFICs such that its phase center may be resembled at the focal points.

In certain embodiments, each of the first and second sides of the microwave lens module is a curved surface.

In certain embodiments, for each two consecutive antenna configuration messages received by the control module, one being the former and first antenna configuration message, and the other one being the latter and second antenna configuration message, at least one of the feed antenna units that corresponds to the former and first antenna configuration message and is to be brought into the working state according to the former and first antenna configuration message is also at least one of the feed antenna units that corresponds to the latter and second antenna configuration message and is to be brought into the working state according to the latter and second antenna configuration message.

In certain embodiments, the array antenna module has a first number of feed antenna unit sets that are arranged in rows distributed along an axis, each of the feed antenna unit sets has at least one of the feed antenna units, the control module can bring every feed antenna unit in a second number of adjacent feed antenna unit sets into the working state according to the at least one antenna configuration message, and the second number is smaller than the first number.

In certain embodiments, for each two consecutive antenna configuration messages received by the control module, one being the former and first antenna configuration message, and the other one being the latter and second antenna configuration message, at least one row of feed antenna units that correspond to the former and first antenna configuration message and are to be brought into the working state according to the former and first antenna configuration message is also at least one row of feed antenna units that correspond to the latter and second antenna configuration message and are to be brought into the working state according to the latter and second antenna configuration message.

In certain embodiments, the microwave lens module is made of a dielectric material, one side of the microwave lens module is formed with a plurality of input-end openings, the other side of the microwave lens module is formed with a plurality of output-end openings, the plurality of the input-end openings are respectively in communication with the plurality of the output-end openings to respectively form a plurality of through holes, and each of the through holes is an array unit of the microwave lens module.

In certain embodiments, the at least one feed antenna unit that is in the working state can form a primary beam of electromagnetic waves, and radiate the primary beam as the at least one input signal to a side of the microwave lens module at a first angle, and the microwave lens module can turn the primary beam into a secondary beam of electromagnetic waves through a plurality of array units of the microwave lens module, and radiate the secondary beam at the other side of the microwave lens module at a second angle.

In certain embodiments, the first angle is equal to or substantially equal to the second angle.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
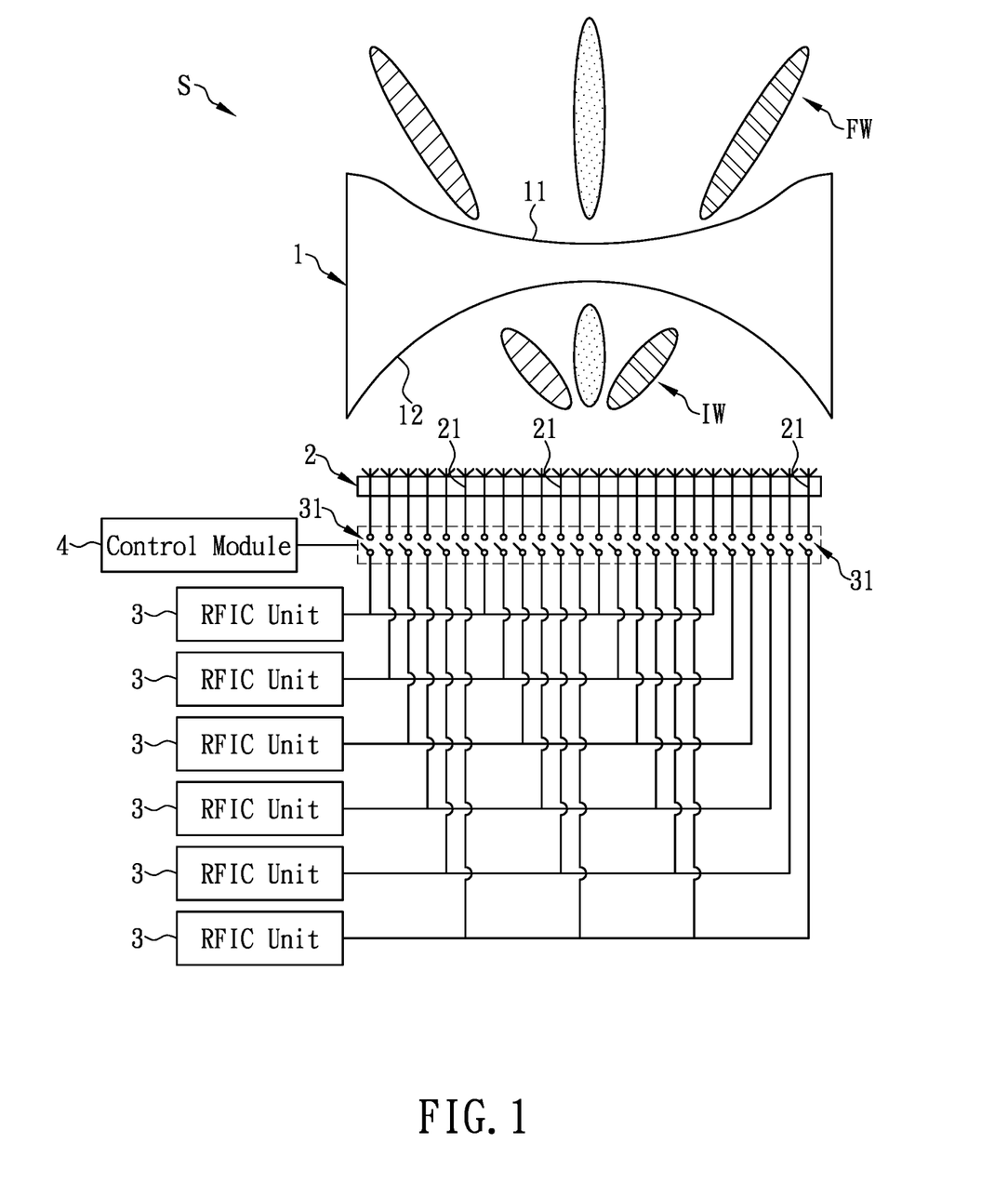
FIG. 1 is a structural schematic diagram of an antenna system according to certain embodiments in the present disclosure.

Certain aspects of the present disclosure are directed to an antenna system capable of beam direction adjustment and allowing shared use of a common set of RFIC units. Referring to FIG. 1, the antenna system S includes a microwave lens module 1, an array antenna module 2, a plurality of RFIC units 3, and a control module 4. The microwave lens module 1 is configured to process at least one input signal (microwave signal) transmitted from the array antenna module 2 through the action of the array units in the microwave lens module 1, so as to turn the at least one input signal into at least one beam of electromagnetic waves that is in a particular direction or in particular directions and is to be output by the microwave lens module 1. In certain embodiments, the microwave lens module 1 can form a plurality of beams that differ in direction, and can form a single beam of a particular direction or simultaneously form a plurality of beams that each is in a particular direction, depending on the phase and amplitude of each input signal. In certain embodiments, the primary beam IW (i.e., input signal) produced by the array antenna module 2 can match a particular point (such as but not limited to a focal point) of the microwave lens module 1, which ensures that the primary beam IW can be turned into the desired secondary beam FW to be radiated through the action of the microwave lens module 1.

Figure 2:
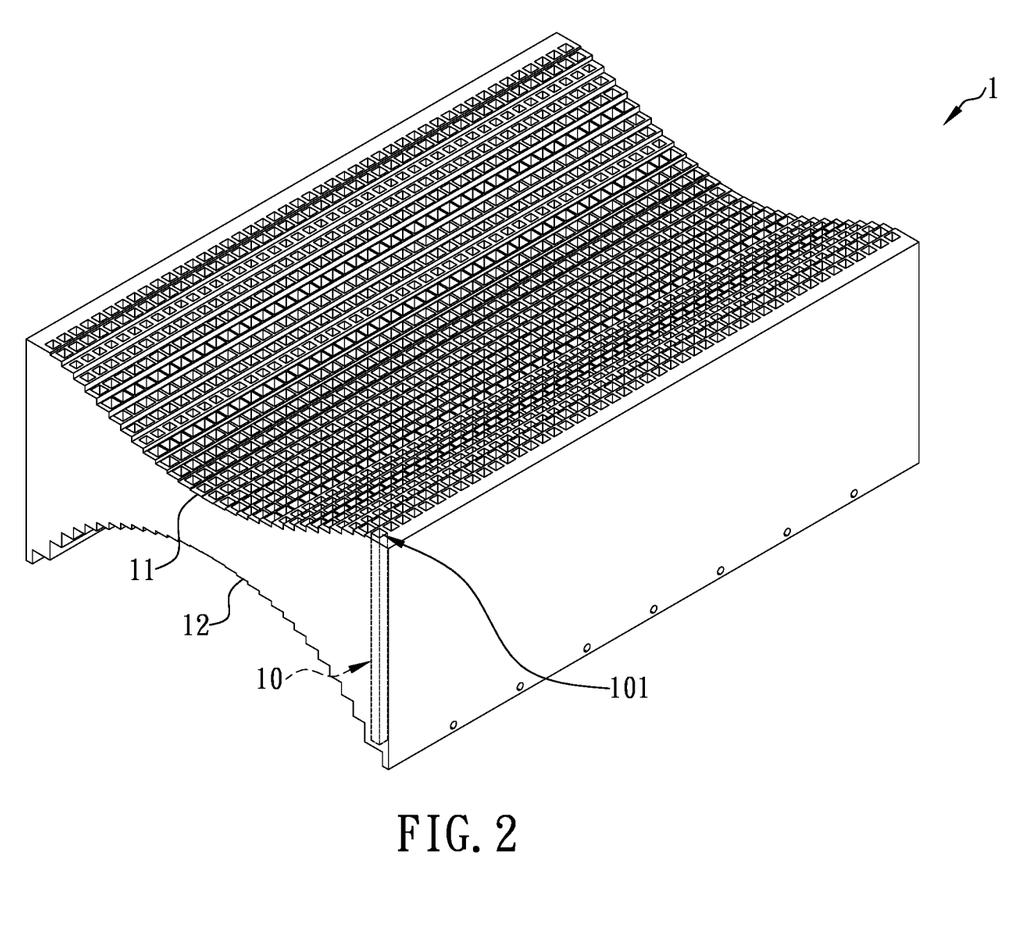
FIG. 2 is a top perspective view of a microwave lens module according to certain embodiments in the present disclosure.
Figure 3:
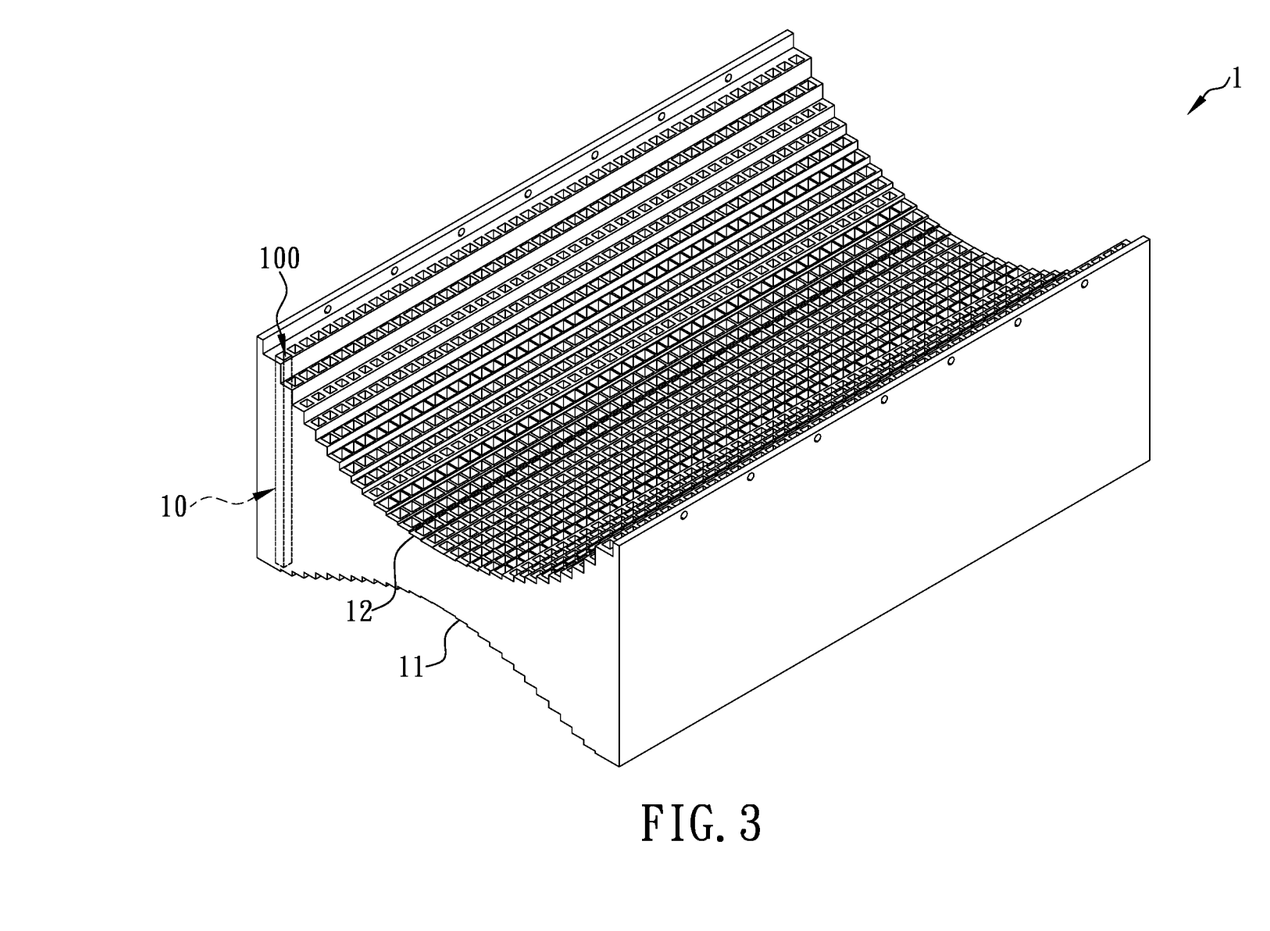
FIG. 3 is a bottom perspective view of the microwave lens module according to certain embodiments in the present disclosure.

Referring to FIG. 2 and FIG. 3, in certain embodiments, the microwave lens module 1 can be designed on the principle of a Rotman lens. For example, the microwave lens module 1 can be made of a single dielectric material (such as acrylonitrile butadiene styrene (ABS), ceramic, glass, etc.) and formed with particular structures (such as the double curved surfaces and through holes 10 shown in FIGS. 1-3), so that the microwave lens module 1 can change the phase and amplitude of the electromagnetic waves passing through itself. In certain embodiments, the aforesaid dielectric material can include metamaterial, and the microwave lens module 1 can be made by 3-dimensional (3D) printing or by other methods. One side of the microwave lens module 1 is formed with a plurality of input-end openings 100, and the other side of the microwave lens module 1 is formed with a plurality of output-end openings 101. Each input-end opening 100 is in communication with one of the output-end openings 101 to form a through hole 10, and each through hole 10 can function as an array unit of the microwave lens module 1. Accordingly, the microwave lens module 1 can receive an input signal from the array antenna module 2 (as exemplarily shown in FIG. 1) through the input-end openings 100 and, after a change in phase takes place along the transmission path in the corresponding through holes 10, output a beam through the corresponding output-end openings 101 that is formed in a particular direction. The design of the microwave lens module 1 is not necessarily based on the principle of a Rotman lens, and as long as a microwave lens module can form and radiate a plurality of beams each having a particular direction based on the input signal(s) of different locations, such a microwave lens module is within the scope of the microwave lens module 1 defined in the present disclosure.

Figure 4:
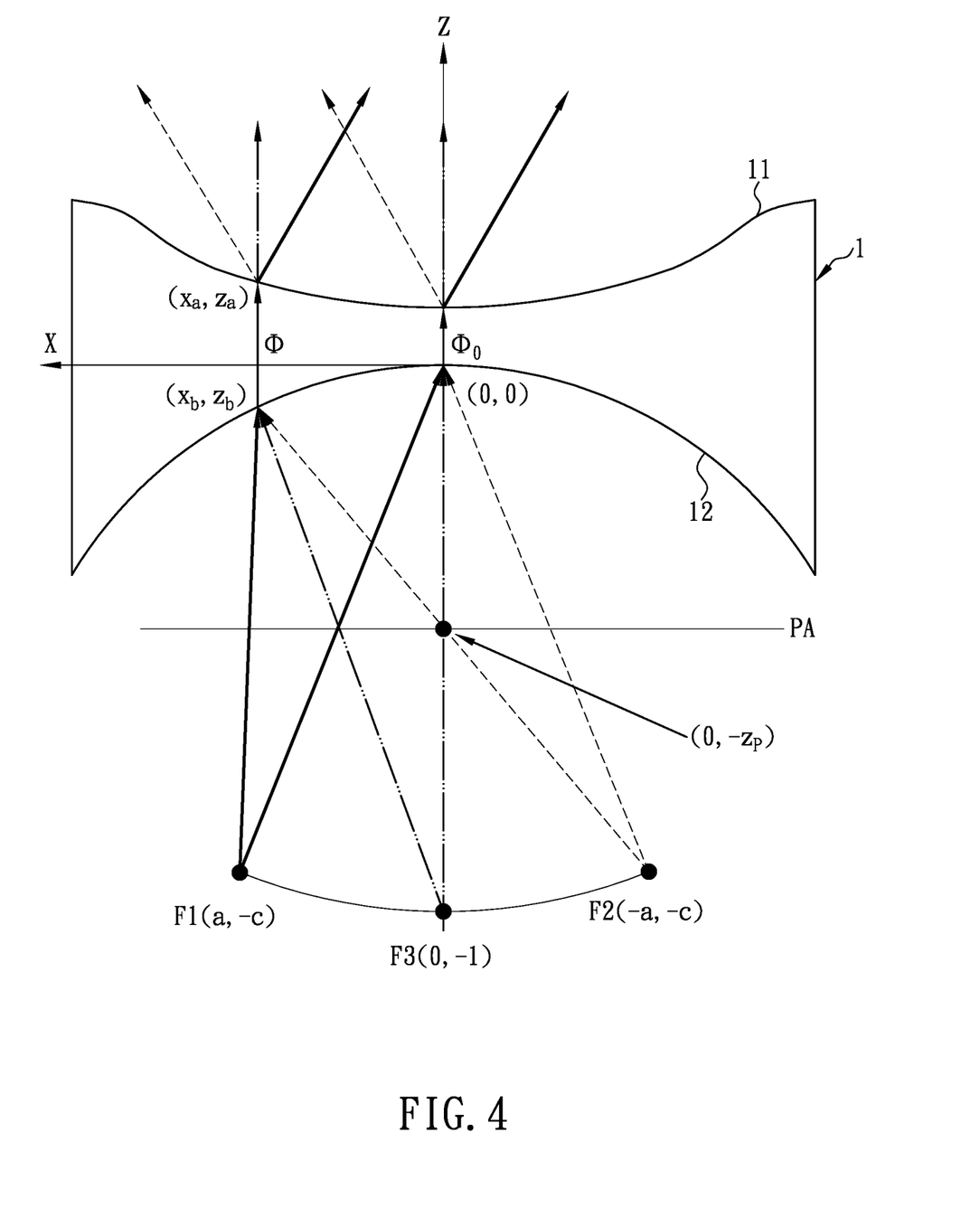
FIG. 4 is a schematic diagram of the focal points of the microwave lens module and the direction of the beam produced by the microwave lens module according to certain embodiments in the present disclosure.

Referring to FIG. 4 in conjunction with FIG. 1, the microwave lens module 1 has an outer curved-surface wall 11, an inner curved-surface wall 12, and three focal points F1, F2, and F3. The focal point F3 is the major-axis focal point (or called as the on-axis focal point). The focal points F1 and F2 are located on two sides of the focal point F3 and are off-axis focal points. The number and locations of the focal points, however, are not limited to those stated above. In other embodiments, the microwave lens module 1 can have more focal points in order to meet actual product requirements. In certain embodiments, referring to FIG. 3, the inner curved-surface wall 12 can be formed with the input-end openings 100. In certain embodiments, referring to FIG. 2, the outer curved-surface wall 11 can be formed with the output-end openings 101. The contours of the outer curved-surface wall 11 and of the inner curved-surface wall 12 of the microwave lens module 1 and the hole dimensions (such as shapes, hole diameters, lengths, etc.) of the input-end openings 100 and of the output-end openings 101 can be calculated according to practical needs so that when an input signal passes through the microwave lens module 1, the phase of the input signal can be adjusted via the different paths corresponding to the different input-end openings 100 and output-end openings 101, so as to enable the directional transmission of the input signal, and to form a beam in a particular direction.

The equations involved in calculating the configuration of the microwave lens module 1 are briefly described below. However, the present disclosure is not limited thereto. Referring to FIG. 4 in conjunction with FIG. 1, the microwave lens module 1, which can focus the primary beams IW sent from the array antenna module 2 and thereby produce high-gain secondary beams FW, can have the following variables, and the variables are normalized with respect to a focal length:

(A1) The intersection of the inner curved-surface wall 12 with a transmission path that originates from the focal point F3 (the major-axis focal point) and coincides with the major axis is defined as the origin (0, 0) of the coordinate system. The origin is the reference point on which subsequent calculations for and setting of the microwave lens module 1 are based.

(A2) The intersection of the outer curved-surface wall 11 with a transmission path that originates from the focal point F1 is defined as point $(x_a, z_a)$ of the coordinate system, and the intersection of the inner curved-surface wall 12 with a transmission path that originates from the focal point F2 is defined as point $(x_b, z_b)$ of the coordinate system.

(A3) The focal point F1 is defined as point $(a, -c)$ of the coordinate system, the focal point F2 as point $(-a, -c)$ of the coordinate system, and the focal point F3 as point $(0, -1)$ of the coordinate system.

(A4) The line segment PA is defined as the position where the array antenna module 2 is placed. The intersections of the line segment PA with transmission paths originating respectively from the focal points F1, F2, and F3 are defined as virtual feed locations. In particular, the intersection of the line segment PA with the transmission path that originates from the focal point F3 and coincides with the major axis is defined as point $(0, -z_P)$ of the coordinate system, wherein $z_P$ is an arbitrary value ranging from 0 to 1.

(A5) The change in phase taking place in each array unit of the microwave lens module 1 is defined as $\Phi$, and the phase at the intersection of the microwave lens module 1 with the transmission path that originates from the focal point F3 is defined as the initial phase $\Phi_0$.

With continued reference to FIG. 4 and FIG. 1, the 3D configuration of the microwave lens module 1 can be calculated, but is not limited to, using the following equations by way of example, in which: variables B1, B2, and B3 correspond to the radiation directions from the focal points F1, F2, and F3 respectively; $w_S$ includes the phase value of the periodic element required for beam (radiation beam) concentration; and $k_0$ represents the free-space propagation constant.

Equations related to the three feed locations are:

$$(x_b - a)^2 + (z_b + c)^2 = (w_s + B1)^2 \qquad (M1)$$

$$(x_b + a)^2 + (z_b + c)^2 = (w_s + B2)^2 \qquad (M2)$$

$$x_b^2 + (z_b + 1)^2 = (w_s + B3)^2 \qquad (M3)$$

where $$w_s = 1 + \frac{\Phi}{k_0}; x_a = x_b; B1 = -ax_a + cz_a; B2 = ax_a + cz_a; \text{ and } B3 = z_a.$$

The following can be derived from above equations:

$$w_s = 1 - cz_a$$

$$z_b = c\left\{-1 + \sqrt{1 - x_a^2}\right\}$$

$$z_a = \frac{\sqrt{x_b^2 + (z_b + 1)^2} - 1}{(1 - c)}$$

Equations (M1)-(M3) can be used to calculate the relationship between each position on/in the microwave lens module 1 (e.g., at $z_a$ or $z_b$) and the corresponding change in phase, thereby allowing the contour of the microwave lens module 1 to be calculated. The performance and configuration of the microwave lens module 1 can therefore be adjusted in order for the microwave lens module 1 to, after receiving input signals of different positions, produce beams of particular directions, each corresponding to a position where an input signal is from. Take FIG. 4 for example, the different types of lines between the inner curved-surface wall 12 and the line segment PA indicate different primary beams IW, which form the corresponding secondary beams FW having different types of lines respectively the same as those of the different primary beams IW by passing through the array units (e.g., the through holes 10) of the microwave lens module 1. That is, each of the corresponding secondary beams FW is indicated by the same type of line as the corresponding primary beam IW. Some of the primary beams IW are transmitted to the inner curved-surface wall 12 of the microwave lens module 1 at a first angle, and the corresponding secondary beams FW are radiated from the outer curved-surface wall 11 of the microwave lens module 1 at a second angle, wherein: the first angle is the angle between a primary beam IW and the major axis of the microwave lens module 1, the second angle is the angle between the corresponding secondary beam FW and the major axis of the microwave lens module 1, and the second angle can be the same or substantially the same as the first angle. However, the present disclosure is not limited thereto.

Figure 5:
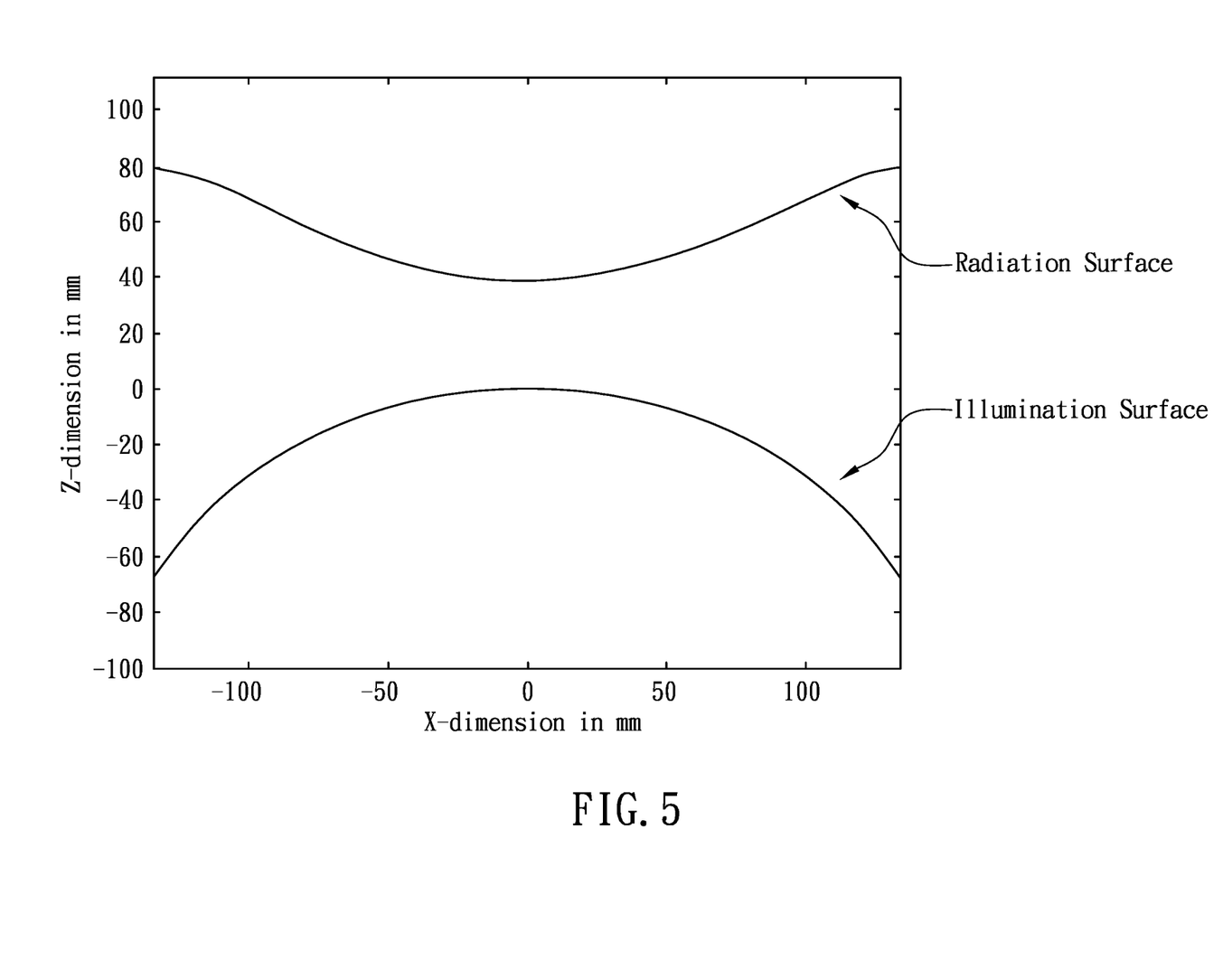
FIG. 5 is a schematic diagram of the calculated contours of the illuminance surface and of the radiation surface of the microwave lens module according to certain embodiments in the present disclosure.
Figure 6:
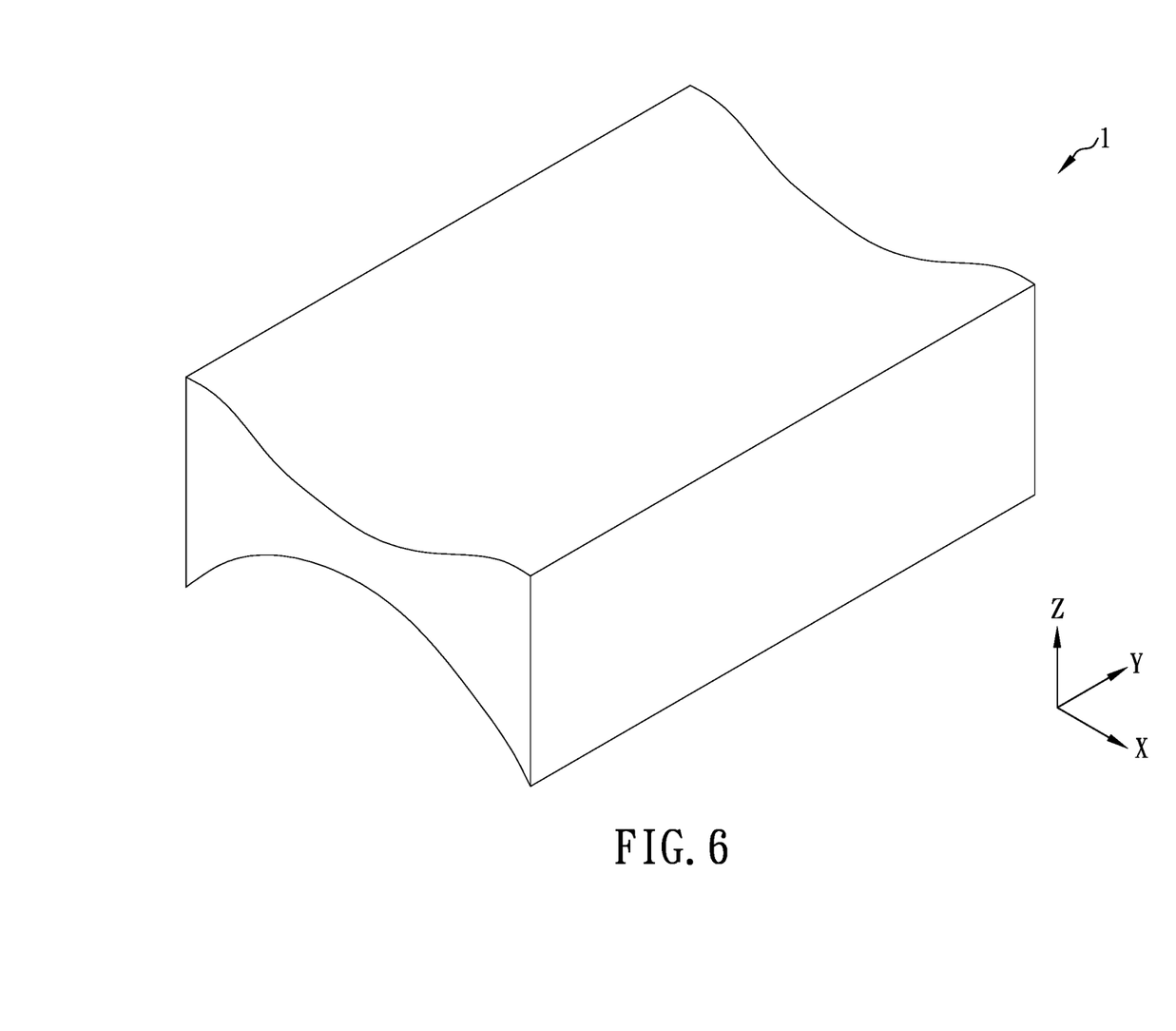
FIG. 6 is a schematic diagram of the appearance of the microwave lens module according to certain embodiments in the present disclosure.

FIG. 5 shows the calculated contours of the illuminance surface and of the radiation surface of a microwave lens module 1. The X axis and the Z axis of the diagram represent the transverse axis and the vertical axis of the spatial configuration of the module respectively. The illuminance surface can serve as the inner curved-surface wall 12 in FIG. 1, and the radiation surface as the outer curved-surface wall 11 in FIG. 1. The calculated configuration in FIG. 5 can be extended along the longitudinal axis (Y axis) by 3D printing to produce the microwave lens module 1 with the desired appearance (see FIG. 6), and the microwave lens module 1 shown in FIG. 2 and FIG. 3 can be obtained by forming a plurality of through holes 10 as the array units in the 3D-printed microwave lens module 1. The resulting microwave lens module 1 can have the following parameters:

Frequency of operation: 12.5 GHz;
Focal length: 150 mm;
Feed points: a 24 by 24 array;
Number of element subarrays in the working state at a time: 6;
Length of smallest element: 39 mm; and
Length of largest element: 147.55 mm.

It should be pointed out that the microwave lens module 1 shown in the drawings is only a part of its feasible embodiments, and that the microwave lens module 1 can be designed differently according to practical needs. In certain embodiments, one of the two opposite sides of the microwave lens module 1 can be a curved surface while the other side is a flat surface. In certain embodiments, the microwave lens module 1 can be made of a plurality of dielectric substrate layers instead of being a waveguide structure formed of a single dielectric material.

Figure 7:
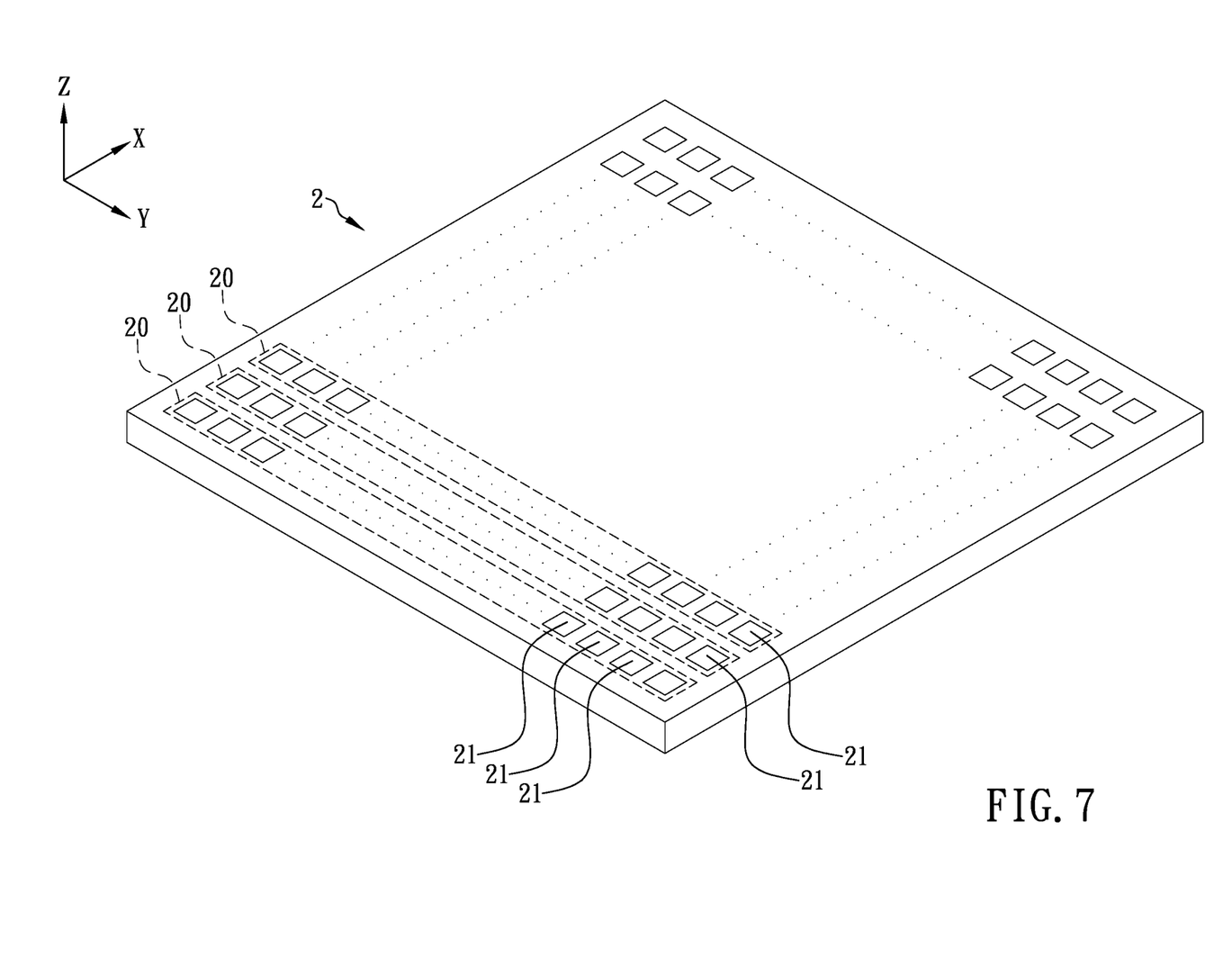
FIG. 7 is a perspective view of an array antenna module according to certain embodiments in the present disclosure.

Referring again to FIG. 1, the array antenna module 2 can be placed at a side of the microwave lens module 1 and includes a plurality of feed antenna units 21 (equivalent to the aforesaid feed points), which in certain embodiments can be arranged in a 24 by 24 array but are not necessarily so arranged. The feed antenna units 21 can be patch antennas or antennas of other configurations, and are configured to radiate at least one input signal toward the input-end openings 100. In certain embodiments, the array antenna module 2 can be located in the region between the inner curved-surface wall 12 and the focal points F1, F2, and F3, such as, but not necessarily at, the position of the line segment PA in FIG. 4. The location and orientation of the array antenna module 2 can be any location and orientation in a 3D space, as long as the input signal(s) generated by the array antenna module 2 can be received by the microwave lens module 1. It should be pointed out that while the spatial configuration of the elements of the antenna system S in FIG. 1 is shown in relation to the transverse axis (X axis) and the vertical axis (Z axis), the array antenna module 2, as shown in FIG. 7, can be provided with a plurality of feed antenna unit sets 20 arranged in rows distributed along the transverse axis (X axis), each feed antenna unit set can have at least one feed antenna unit 21 (for example, each feed antenna unit set 20 in FIG. 7 is shown to have a plurality of feed antenna units 21 arranged along the longitudinal axis (Y axis)). In other words, there can be one or more feed antenna units 21 at the same vertical-axis (Z-axis) position, and the feed antenna unit(s) 21 in a feed antenna unit set 20 can be arranged along the longitudinal axis (Y axis).

With continued reference to FIG. 1, each RFIC unit 3 is electrically connected to a corresponding plurality of feed antenna units 21 through a plurality of switching units 31. Each of the switching units 31 can be a diode (e.g., a PIN diode), a switch (e.g., a high-electron-mobility transistor (HEMT), metal-oxide-semiconductor field-effect transistor (MOSFET), etc.), etc. In certain embodiments, each feed antenna unit 21 is electrically connected to one corresponding switching unit 31. In certain embodiments, the plurality of feed antenna units 21 that are at the same vertical-axis position (e.g., in the same feed antenna unit set 20) can be electrically connected to one switching unit 31. When a switching unit 31 is switched on, that is, in the ON state, the feed antenna unit(s) 21 connected to the switching unit 31 will be able to radiate or receive electromagnetic waves. When the switching unit 31 is switched off, that is, in the OFF state, the feed antenna unit(s) 21 connected to the switching unit 31 will be unable to radiate or receive electromagnetic waves. The number of the RFIC units 3 is less than the number of the feed antenna units 21. For example, in FIG. 1, six RFIC units 3 and far more than six feed antenna units 21 are shown in an antenna system S.

With continued reference to FIG. 1, the control module 4 is electrically connected at least to each switching unit 31 and is configured to control each switching unit 31 directly or indirectly so as to bring each switching unit 31 into the ON state or the OFF state. In certain embodiments, the control module 4 can be integrated into the RFIC units 3. Therefore, as long as a control module can control a switching unit 31 and thereby bring the switching unit 31 into the ON or OFF state, such a control module is within the scope of the control module 4 defined in the present disclosure, regardless of its being an independent element or integrated into other elements. When the control module 4 is an independent element, it can be electrically connected to each RFIC unit 3 in order to control the operation of each RFIC unit 3. The control module 4 is configured to receive an antenna configuration message, whose content include the number and direction(s) of the beam(s) to be formed by the microwave lens module 1. It should be pointed out that the content of the antenna configuration message is not limited to a specific description of the number and direction(s) of the beam(s) to be formed, and that the content can include other antenna configuration-related information. The control module 4 can also compute based on such other antenna configuration-related information to derive the number and direction(s) of the beam(s) to be formed. For example, assuming that the antenna system S is used to track a low-Earth-orbit (LEO) satellite, the antenna configuration message can include positional information of the LEO satellite (e.g., a two-line element set (TLE)) so that the control module 4 can compute based on the positional information to derive the current position and future positions of the LEO satellite, in order for the antenna system S to produce beams directed toward the LEO satellite.

This and the following paragraphs further describe how beams in particular directions corresponding to the positions of an object to be tracked (e.g., a LEO satellite or vehicle) can be produced according to the present disclosure. In certain embodiments, referring to FIG. 8 in conjunction with FIG. 1, the array antenna module 2 can include, but is not limited to, 24 feed antenna units 21 arranged along the X-axis direction (i.e., along the left-right direction in FIGS. 1 and 8), each connected to one of 24 switching units 31 arranged along the same direction (not counting the feed antenna units 21 or switching units 31 in the Y-axis direction). The feed antenna units 21 can be sequentially defined, from left to right, as the first feed antenna unit 21, the second feed antenna unit 21, the third feed antenna unit 21, . . . , and the $24^{th}$ feed antenna unit 21. Similarly, the switching units 31 can be sequentially defined, from left to right, as the first switching unit 31, the second switching unit 31, the third switching unit 31, . . . , and the $24^{th}$ switching unit 31. In addition, the six RFIC units 3 shown in FIG. 8 can be sequentially defined, from the top down, as the first RFIC unit 3, the second RFIC unit 3, . . . , and the sixth RFIC unit 3. The first RFIC unit 3 can be electrically connected to the first, the seventh, the $13^{th}$, and the $19^{th}$ switching units 31. The second RFIC unit 3 can be electrically connected to the second, the eighth, the $14^{th}$, and the $20^{th}$ switching units 31. The third RFIC unit 3 can be electrically connected to the third, the ninth, the $15^{th}$, and the $21^{st}$ switching units 31. The fourth RFIC unit 3 can be electrically connected to the fourth, the tenth, the $16^{th}$, and the $22^{nd}$ switching units 31. The fifth RFIC unit 3 can be electrically connected to the fifth, the $11^{th}$, the $17^{th}$, and the $23^{rd}$ switching units 31. The sixth RFIC unit 3 can be electrically connected to the sixth, the $12^{th}$, the $18^{th}$, and the $24^{th}$ switching units 31. When the object to be tracked is at a first position, the control module 4 can, according to a first antenna configuration message, bring the first through the sixth switching units 31 (i.e., six adjacent switching units 31) into the ON state while leaving the other switching units 31 in the OFF state. Accordingly, the first through the sixth feed antenna units 21 (i.e., six adjacent feed antenna units 21) are brought into the working state and can therefore receive signals from the RFIC units 3, form the corresponding primary beam IW, and radiate the primary beam IW (i.e., an input signal) toward the microwave lens module 1 at the angle θ1. The primary beam IW is then received by the microwave lens module 1, and goes through the action of the corresponding through holes 10 (equivalent to the phase shifter signs shown in FIG. 8) in the microwave lens module 1, and the microwave lens module 1 accordingly can turn the primary beam IW into a secondary beam FW and radiate the secondary beam FW toward the position of the to-be-tracked object at the angle θ2.

Figure 9:
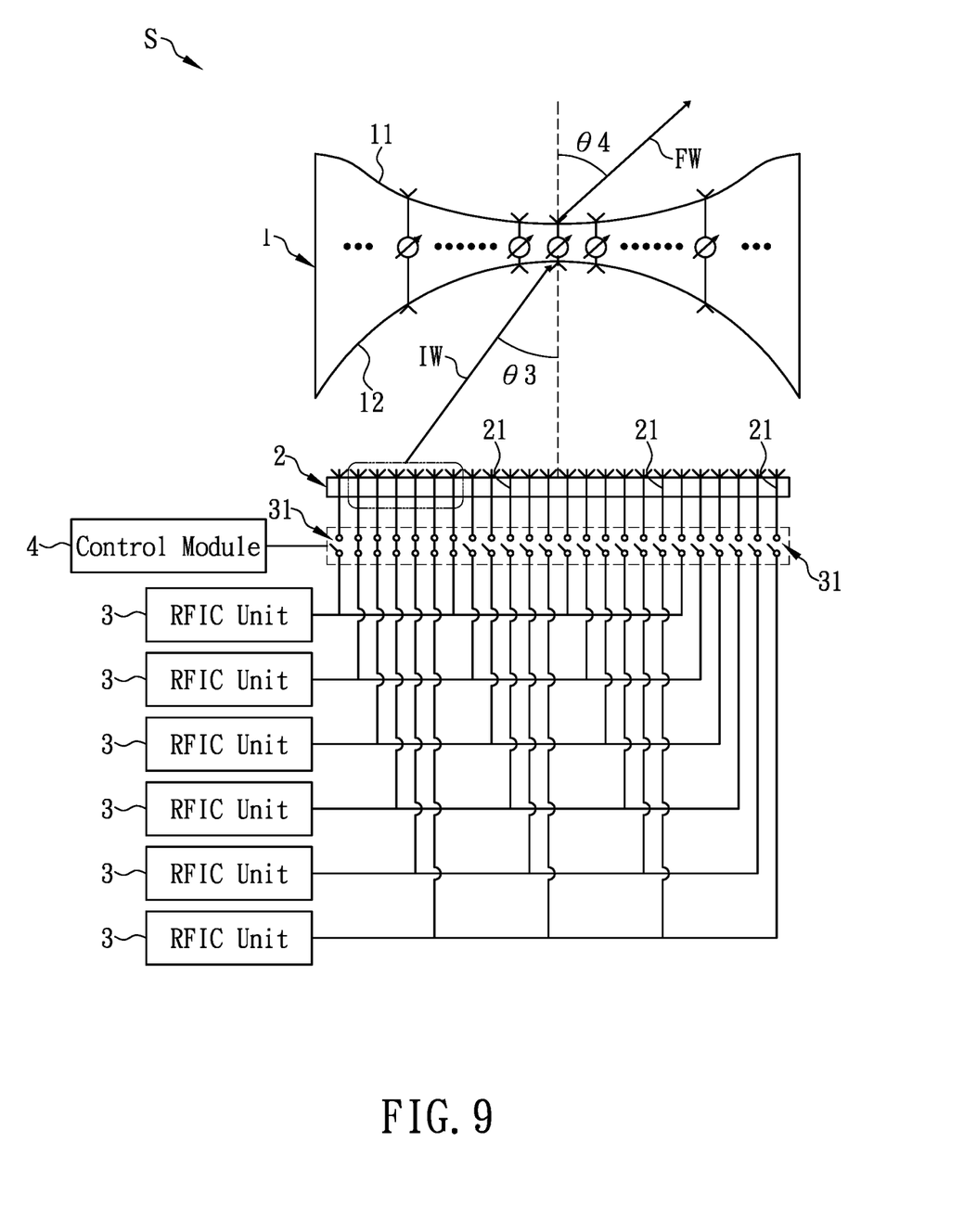
FIG. 9 is a schematic diagram showing an antenna system switching to corresponding switching units according to a second antenna configuration message according to certain embodiments in the present disclosure.

When the to-be-tracked object reaches a second position, referring to FIG. 9, the control module 4 can, according to a second antenna configuration message, brings the second through the seventh switching units 31 (i.e., another six adjacent switching units 31) into the ON state while leaving the other switching units 31 in the OFF state. Accordingly, the second through the seventh feed antenna units 21 (i.e., another six adjacent feed antenna units 21) are brought into the working state and can therefore receive signals from the RFIC units 3, form another primary beam IW (hereinafter referred to as the second primary beam IW), and radiate the second primary beam IW (i.e., another input signal) toward the microwave lens module 1 at the angle θ3. The second primary beam IW is then received by the microwave lens module 1 and turned into a secondary beam FW radiated at the angle θ4 toward the position of the to-be-tracked object. As the to-be-tracked object (e.g., a LEO satellite) continues moving, the control module 4 works in a similar manner and sequentially brings different groups of six adjacent switching units 31 into the ON state while leaving the other switching units 31 in the OFF state. As a result, the positions of the six adjacent feed antenna units 21 in the working state keep changing, allowing the array antenna module 2 to sequentially produce primary beams IW that are radiated to the microwave lens module 1 at different angles. The different primary beams IW go through the action of the microwave lens module 1 and are thus sequentially turned into secondary beams FW each radiated at a particular angle. It should be pointed out that the afore-referenced six feed antenna units 21 along the transverse axis that are in the working state, that is, the six feed antenna unit sets 20 (when the longitudinal axis (Y axis) is also taken into consideration) corresponding to the six feed antenna units, represent the number of the element subarrays in the working state at a time; in other words, the number of the element subarrays in the working state at a time is six. However, the present disclosure is not limited thereto. The number of elements in an element subarray, and the number of the feed antenna units 21 that are in the working state at the same time can be increased or decreased according to practical needs, and the number of the RFIC units 3 can be adjusted accordingly. After selecting the feed antenna unit(s)/subarray(s) active to produce the desired directional beam, the RFICs associated therewith are configured to produce the radiation pattern of the desired feed antenna unit(s) with an effective focused phase center near the focal plane formed by the focal points. In certain embodiments, RFIC reconfiguration can be achieved through adjusting their phases to excite the feed antenna units such that the radiations of each feed antenna unit through the microwave lens module form an equal-phase superposition for maximum directivity.

Figure 8:
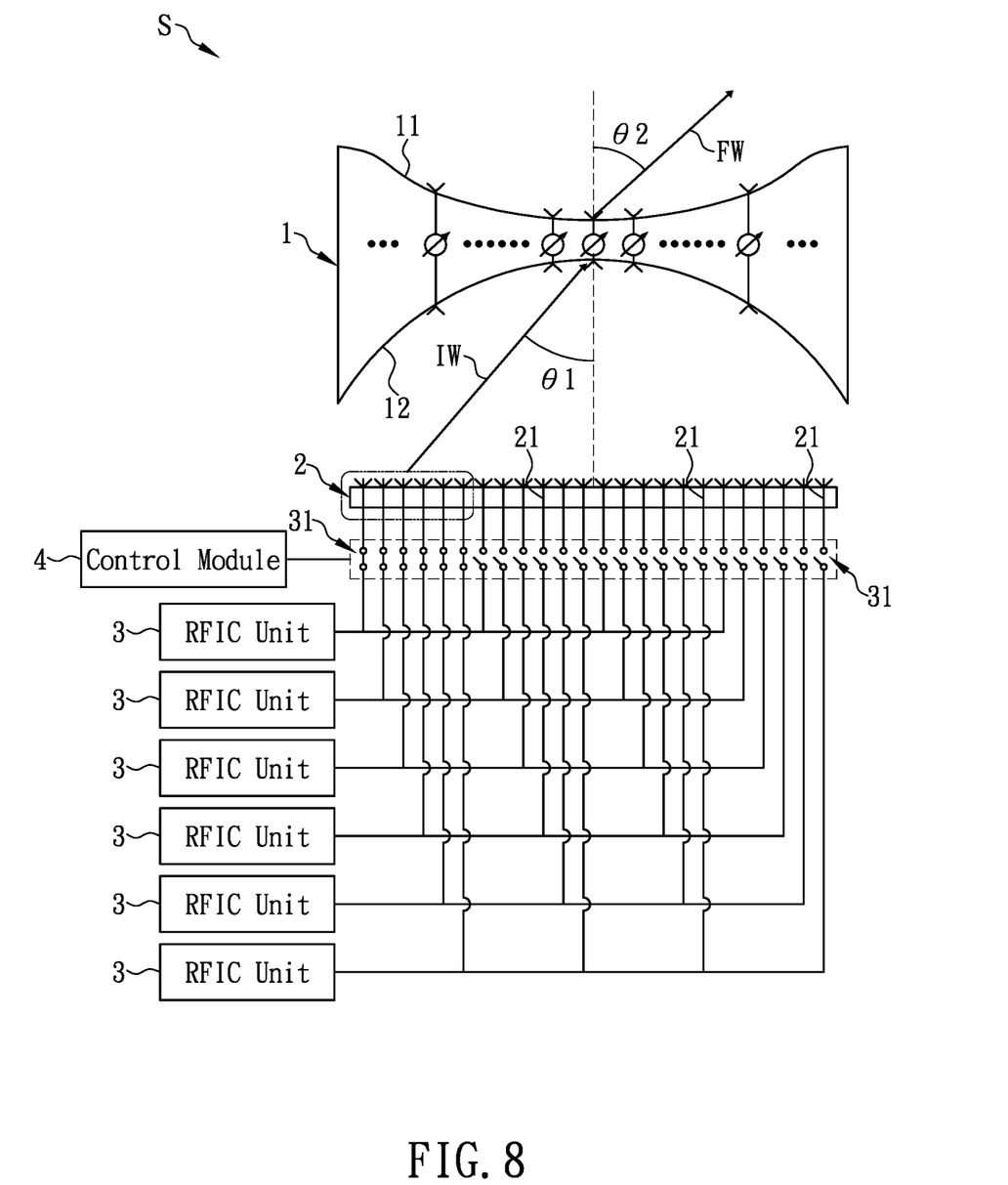
FIG. 8 is a schematic diagram showing an antenna system switching to corresponding switching units according to a first antenna configuration message according to certain embodiments in the present disclosure.

In other words, referring to FIG. 1, FIG. 8, and FIG. 9, the control module 4 can adjust the ON/OFF state of each switching unit 31 according to the antenna configuration message received and thereby change the state of each feed antenna unit 21. A feed antenna unit 21 electrically connected to a switching unit 31 in the ON state is in the working state, whereas a feed antenna unit 21 electrically connected to a switching unit 31 in the OFF state is in the non-working state. Furthermore, for each two consecutive first and second antenna configuration messages, the at least one feed antenna unit 21 corresponding to the first antenna configuration message and being brought into the working state according to the first antenna configuration message will reappear as at least one feed antenna unit 21 of the feed antenna unit(s) 21 corresponding to the second antenna configuration message and being brought into the working state according to the second antenna configuration message. For example, as discussed supra, the second through the sixth feed antenna units 21 can be the reappearing feed antenna units 21 in the first and the second antenna configuration messages.

It can be known from the above that the antenna system S according to the present disclosure can adjust the ON/OFF state of each switching unit 31 and thereby activate (i.e., bring into the working state) its corresponding feed antenna unit 21, in order for each input signal (e.g., primary beam IW) produced by the array antenna module 2 to be turned into a beam of a particular direction (e.g., secondary beam FW) by the microwave lens module 1. That is to say, the antenna system S effectively allows shared use of the RFIC units 3 so that only a small number of RFIC units 3 are required for activating a part of the feed antenna units 21 according to the positions of the object to be tracked (e.g., a LEO satellite or vehicle) and thereby changing the beam direction of the antenna system S dynamically to enable beam scanning. Moreover, it is not necessary for each feed antenna unit 21 to have an independent matching RFIC unit 3, which helps lower the cost and design complexity of the antenna system S by substantially reducing the number of the RFIC units 3 required.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna system, comprising:
   an array antenna module, comprising a plurality of feed antenna units configured to produce at least one input signal;
   a plurality of radio-frequency integrated circuit units respectively electrically connected to the plurality of feed antenna units through a plurality of switching units, wherein a number of the plurality of radio-frequency integrated circuit units is smaller than a number of the plurality of feed antenna units;
   a microwave lens module, having a first side configured to receive the at least one input signal, configured to form at least one beam of electromagnetic waves corresponding to the at least input signal, and having a second side configured to radiate the at least one beam of electromagnetic waves in a particular direction; and
   a control module electrically connected to the plurality of switching units and configured to:
   control directly or indirectly each of the plurality of switching units to be switched on or off;
   receive at least one antenna configuration message; and
   control, based on the at least one antenna configuration message, at least one of the plurality of switching units to be switched on and rest of the plurality of switching units to be switched off, wherein at least one of the plurality of feed antenna units is electrically connected to the at least one of the plurality of switching units that is switched on, and the at least one of the plurality of feed antenna units is in a working state and configured to receive at least one signal from the plurality of radio-frequency integrated circuit units, and radiate the at least one input signal corresponding to the at least one signal received from the plurality of radio-frequency integrated circuit units to the microwave lens module,
   wherein the array antenna module has a total of a first number of rows of feed antenna unit sets, the rows of feed antenna unit sets are distributed along an axis, each of the rows of feed antenna unit sets has at least one of the plurality of feed antenna units, and the control module is configured to bring every feed antenna unit in a second number of rows of adjacent feed antenna unit sets of the first number of the rows of feed antenna unit sets into the working state according to the at least one antenna configuration message; and
   wherein the rows of feed antenna unit sets include a first plurality of rows of feed antenna unit sets not adjacent to each other and a second plurality of rows of feed antenna unit sets not adjacent to each other; each of the second plurality of the rows of feed antenna unit sets is adjacent to a corresponding one of the first plurality of the rows of feed antenna unit sets; a first one of the plurality of radio-frequency integrated circuit units is connected to the first plurality of the rows of feed antenna unit sets through a first plurality of the plurality of switching units, respectively; a second one of the plurality of radio-frequency integrated circuit units is connected to the second plurality of the rows of feed antenna unit sets through a second plurality of the plurality of switching units, respectively; and the control module is configured to:
   control, based on a first antenna configuration message, a first one of the first plurality of the switching units to be switched on, rest of the first plurality of switching units to be switched off, a first one of the second plurality of the switching units to be switched on, and rest of the second plurality of switching units to be switched off, so that a first row of the first plurality of the rows of feed antenna unit sets that is connected to the first one of the first plurality of the switching units, and a row of the second plurality of the rows of feed antenna unit sets that is adjacent to the first row of the first plurality of the rows of feed antenna unit sets and connected to the first one of the second plurality of the switching units are in the working state; and
   control, based on a second antenna configuration message, a second one of the first plurality of the switching units to be switched on, the first one of the first plurality of switching units to be switched off, so that a second row of the first plurality of the rows of feed antenna unit sets that is connected to the second one of the first plurality of the switching units, and the row of the second plurality of the rows of feed antenna unit sets are in the working state.

2. The antenna system according to claim 1, wherein the microwave lens module has a plurality of focal points on one side of the microwave lens module, and the array antenna module is located between the one side of the microwave lens module and the plurality of focal points.

3. The antenna system according to claim 1, wherein each of the first side and the second side of the microwave lens module is a curved surface.

4. The antenna system according to claim 1, wherein for each two consecutive first and second antenna configuration messages received by the control module, at least one of the plurality of feed antenna units that corresponds to the first antenna configuration message and is to be brought into the working state according to the first antenna configuration message is also at least one of the plurality of feed antenna units that corresponds to the second antenna configuration message and is to be brought into the working state according to the second antenna configuration message.

5. The antenna system according to claim 1, wherein the second number is smaller than the first number.

6. The antenna system according to claim 1, wherein for each two consecutive first and second antenna configuration messages received by the control module, at least one row of the first number of the rows of feed antenna unit sets that corresponds to the first antenna configuration message and is to be brought into the working state according to the first antenna configuration message is also at least one row of the first number of the rows of feed antenna unit sets that corresponds to the second antenna configuration message and is to be brought into the working state according to the second antenna configuration message.

7. The antenna system according to claim 1, wherein the microwave lens module is made of a dielectric material, one side of the microwave lens module is formed with a plurality of input-end openings, an other side of the microwave lens module is formed with a plurality of output-end openings, the plurality of the input-end openings are respectively in communication with the plurality of the output-end openings to respectively form a plurality of through holes, and each of the plurality of through holes is an array unit of the microwave lens module.

8. The antenna system according to claim 1, wherein the at least one of the plurality of feed antenna units that is in the working state is configured to form a primary beam of electromagnetic waves, and radiate the primary beam as the at least one input signal to a side of the microwave lens module at a first angle, and the microwave lens module is configured to turn the primary beam into a secondary beam of electromagnetic waves through a plurality of array units of the microwave lens module, and radiate the secondary beam at an other side of the microwave lens module at a second angle.

9. The antenna system according to claim 8, wherein the first angle is equal to the second angle.

10. The antenna system according to claim 1, wherein the array antenna module is located between a plurality of focal points of the microwave lens module and one of the first side and the second side of the microwave lens module that faces the plurality of focal points, and located not at any of the plurality of focal points of the microwave lens module.

* * * * *